(12) United States Patent
Karri et al.

(10) Patent No.: US 12,056,529 B2
(45) Date of Patent: Aug. 6, 2024

(54) COMPUTATION SERVICE BY AUTONOMOUS VEHICLES

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Sampath Kumar Pulupula Venkata, Visakhapatnam (IN); Kamal Kiran Trood Yamala, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 17/448,290

(22) Filed: Sep. 21, 2021

(65) Prior Publication Data

US 2023/0088692 A1 Mar. 23, 2023

(51) Int. Cl.
*G06F 9/50* (2006.01)
*B60W 50/06* (2006.01)
(Continued)

(52) U.S. Cl.
CPC .......... *G06F 9/5027* (2013.01); *B60W 50/06* (2013.01); *B60W 60/001* (2020.02);
(Continued)

(58) Field of Classification Search
CPC ...... G06F 9/5027; G06F 9/5072; G06F 9/505; G06F 2209/5019; B60W 50/06;
(Continued)

(56) References Cited

U.S. PATENT DOCUMENTS 9,805,431 B2    10/2017  Scicluna
2017/0123422 A1  5/2017  Kentley-Klay
(Continued)

FOREIGN PATENT DOCUMENTS

CN   108845885   * 11/2018  ........... G06F 9/4881
CN   108845885 A   11/2018
(Continued)

OTHER PUBLICATIONS

Mell, et al., "The NIST Definition of Cloud Computing", National Institute of Standards and Technology, Special Publication 800-145, Sep. 2011, 7 pages.
(Continued)

*Primary Examiner* — Joan T Goodbody
(74) *Attorney, Agent, or Firm* — Robert R. Aragona

(57) ABSTRACT

A method, computer system, and a computer program product for allocating unused computing resources of a plurality autonomous vehicles is provided. The present invention may include receiving at least one computation request from at least one user. The present invention may include identifying the unused computing resources of the plurality of autonomous vehicles. The present invention may include predicting an amount of computational activities performable by the unused computing resources of the plurality of autonomous vehicles. The present invention may include allocating the unused computing resources of the plurality of autonomous vehicles to perform the predicted amount of computational activities, wherein the received at least one computation request is allocated at least a portion of the unused computing resources. The present invention may include distributing a processing load to at least one of the plurality of autonomous vehicles.

17 Claims, 5 Drawing Sheets

(51) Int. Cl.
  *B60W 60/00* (2020.01)
  *G01C 21/34* (2006.01)
  *G01C 21/36* (2006.01)
  *G07C 5/02* (2006.01)

(52) U.S. Cl.
  CPC ..... *G01C 21/3453* (2013.01); *G01C 21/3691* (2013.01); *G06F 9/5072* (2013.01); *G07C 5/02* (2013.01); *B60W 2555/20* (2020.02)

(58) Field of Classification Search
  CPC ............ B60W 60/001; B60W 2555/20; G01C 21/3453; G01C 21/3691; G01C 21/3415; G01C 21/3461; G07C 5/02
  See application file for complete search history.

(56) References Cited

U.S. PATENT DOCUMENTS

| | | | |
|---|---|---|---|
| 2017/0124781 A1 | 5/2017 | Sol | |
| 2018/0300964 A1 | 10/2018 | Lakshamanan | |
| 2019/0294473 A1* | 9/2019 | Martin | G06F 11/3495 |
| 2020/0027354 A1* | 1/2020 | Goldman | G07C 5/008 |
| 2020/0064842 A1* | 2/2020 | Kentley-Klay | G05D 1/0027 |
| 2020/0116515 A1 | 4/2020 | Chadha | |
| 2021/0174678 A1* | 6/2021 | Wright | G06F 9/5072 |

FOREIGN PATENT DOCUMENTS

| | | | | |
|---|---|---|---|---|
| CN | 111301433 A | | 6/2020 | |
| CN | 113191588 | * | 7/2021 | ............ H04W 72/51 |
| CN | 113191588 A | | 7/2021 | |

OTHER PUBLICATIONS

Raza, et al., "An Efficient Task Offloading Scheme in Vehicular Edge Computing," Journal of Cloud Computing: Advances, Systems and Applications, Jun. 2, 2020, 14 pages, vol. 9, Article 28, Springer Open, DOI: 10.1186/s13677-020-00175-w, Retrieved from the Internet: <URL: https://journalofcloudcomputing.springeropen.com/track/pdf/10.1186/s13677-020-00175-w.pdf>.

International Searching Authority, "Notification of Transmittal of the International Search Report and the Written Opinion of the International Searching Authority, or Declaration," File Reference IEE220510PCT, International application No. PCT/CN2022/104262, International Filing Date Jul. 7, 2022, Mailed on Aug. 25, 2022, 9 pages.

* cited by examiner

COMPUTATION SERVICE BY AUTONOMOUS VEHICLES

BACKGROUND

The present invention relates generally to the field of computing, and more particularly to autonomous vehicles.

Autonomous vehicles may have many computational capabilities, including performing complex computations. An individual autonomous vehicle may have an ability to provide computational service(s) and at least two autonomous vehicles may have, depending on a type of the autonomous vehicle, proportionately more available computing resources. When at least two autonomous vehicles collaborate, and the available computing resources are aggregated, processing of at least one computation request may be faster.

SUMMARY

Embodiments of the present invention disclose a method, computer system, and a computer program product for allocating unused computing resources of a plurality autonomous vehicles. The present invention may include receiving at least one computation request from at least one user. The present invention may include identifying the unused computing resources of the plurality of autonomous vehicles. The present invention may include predicting an amount of computational activities performable by the unused computing resources of the plurality of autonomous vehicles. The present invention may include allocating the unused computing resources of the plurality of autonomous vehicles to perform the predicted amount of computational activities, wherein the received at least one computation request is allocated at least a portion of the unused computing resources. The present invention may include distributing a processing load to at least one of the plurality of autonomous vehicles.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
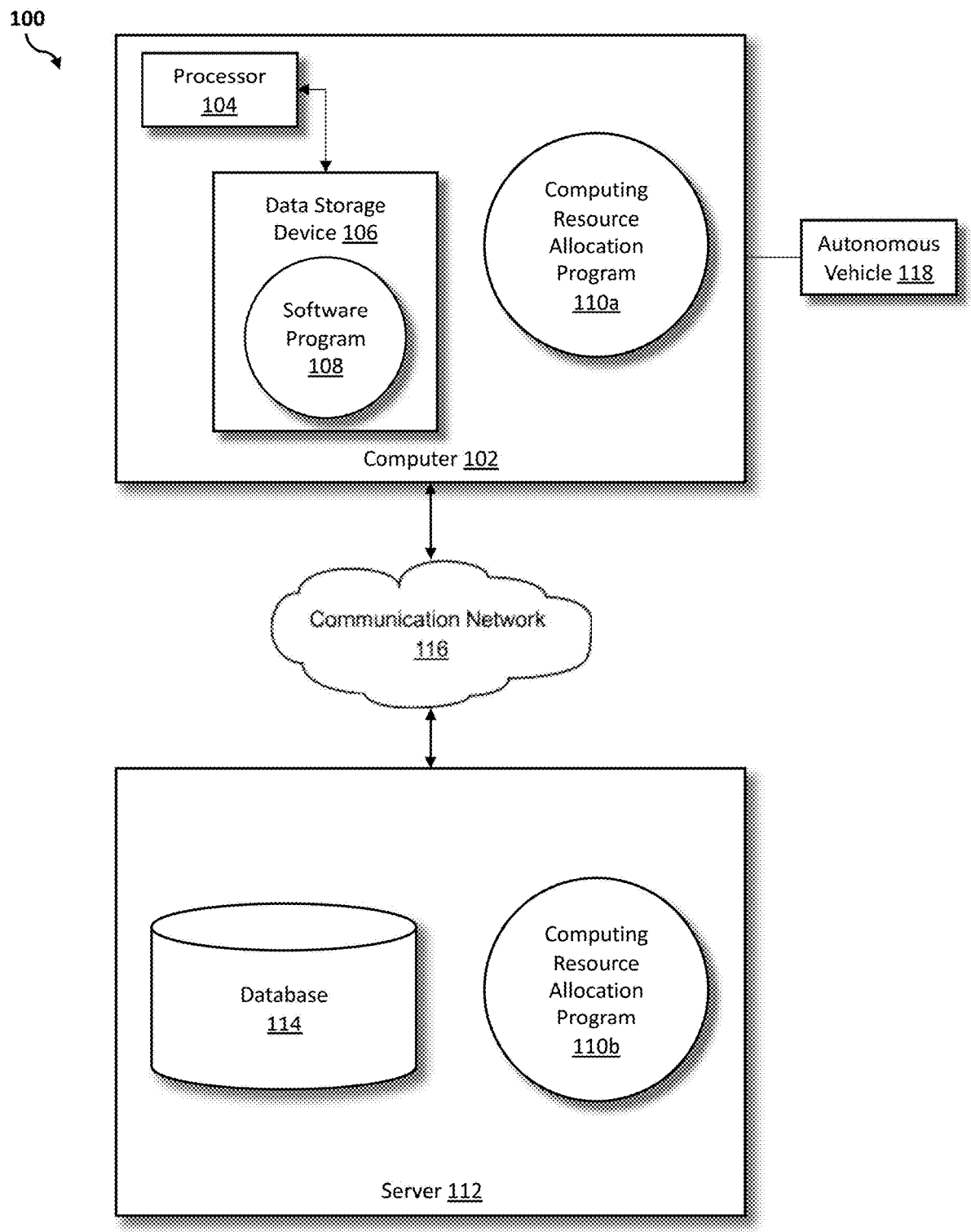
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for allocating unused computing resources of a plurality autonomous vehicles. As such, the present embodiment has the capacity to improve the technical field of cognitive applications by allocating unutilized computing resources of autonomous vehicles to provide computational service(s) to surrounding ecosystems. More specifically, the present invention may include receiving at least one computation request from at least one user. The present invention may include identifying the unused computing resources of the plurality of autonomous vehicles. The present invention may include predicting an amount of computational activities performable by the unused computing resources of the plurality of autonomous vehicles. The present invention may include allocating the unused computing resources of the plurality of autonomous vehicles to perform the predicted amount of computational activities, wherein the received at least one computation request is allocated at least a portion of the unused computing resources. The present invention may include distributing a processing load to at least one of the plurality of autonomous vehicles.

As described previously, autonomous vehicles may have many computational capabilities, including performing complex computations. An individual autonomous vehicle may have an ability to provide computational service(s) and at least two autonomous vehicles may have, depending on a type of the autonomous vehicle, proportionately more available computing resources. When at least two autonomous vehicles collaborate, and the available computing resources are aggregated, processing of at least one computation request may be faster. However, aggregating computing resources of autonomous vehicles may require identifying any computational capabilities of the autonomous vehicles, as well as type(s) of computational capabilities (e.g., to determine whether combining resources may be feasible), and many other factors.

Therefore, it may be advantageous to, among other things, develop a system by which the autonomous vehicles may collaborate with one another to perform a computational workload. This may enable faster processing of real-time computation requests, delivery of computational needs with lower latency, and a reward system based on participation in the collaborative system.

According to at least one embodiment, the present invention may enable collaboration between vehicles on a roadway, the vehicles both receiving a computation request and processing the computation request in a collaborative manner.

According to at least one embodiment, the present invention may utilize a machine learning model (e.g., historical learning) to predict aggregated computing resources which may be available, and which may be used for computational services. The machine learning model may consider any unused (i.e., unutilized) computing resources of each of a plurality of autonomous vehicles which elect to be part of the computing resource allocation system. Then, further based on predicted computational needs of a received computation request, the computing resource allocation system may evaluate a number of autonomous vehicles which may be required to support an associated workload (e.g., the associated workload of the received computation request). Accordingly, the computing resource allocation system may ensure a required number of autonomous vehicles may be present to support the received computation request (e.g., and the associated workload).

According to at least one embodiment, based on predicted computational needs of a received computation request (e.g., or an associated workload of the received computation request), the present invention may dynamically position autonomous vehicles to enable support by the computing resource allocation system of the received computation request. An autonomous vehicle may be a computer-controlled vehicle which may make driving decisions dynamically based on identified contextual situations. For example, the driving decisions made by the autonomous vehicle may be the vehicle's own (e.g., including lane changes, relative position in a roadway, etc.). In this case, the autonomous vehicle participating in the computing resource allocation system may dynamically position itself based on predicted computational needs and an ability to satisfy those needs.

According to at least one embodiment, the computing resource allocation system may calculate an aggregated available memory distribution on a time scale (e.g., dynamically, depending on a speed of an autonomous vehicle, among other factors, to determine an amount of memory and other processing power which may be available), and accordingly, may distribute the associated workload for the received computation request and may manage the autonomous vehicle traffic on the same time scale. Autonomous vehicles may have computing resources including processing and storage memory, which computing resources may be required for performing edge computation (e.g., computation which may be done in real-time on site and/or near a data source, minimizing a need for data to be transmitted to and processed in a remote datacenter). A computation request processed using edge computation may minimize network overhead, while data requiring further analysis and/or permanent storage may still be sent to a cloud server for future access. As described previously, the amount of resources of each autonomous vehicle may vary, and thus, when the autonomous vehicles collaborate, the edge resources of the autonomous vehicles may be aggregated.

According to at least one embodiment, if more than one computation request is received, the computing resource allocation system may dynamically assign an appropriate amount of the unused (i.e., unutilized) computing resources to enable each of the received requests to be handled by the computing resource allocation system. The computing resource allocation system may further use a smart contract (e.g., a computer code which may automatically monitor, execute and enforce a legal agreement) to appropriately handle each of the received computation requests. Practically, this may mean that, based on a legal agreement, each of the received computation requests may be provided appropriate security and/or may be isolated on different computing systems, as necessary, so that each request may be processed individually (based on, for example, the handling of privileged information).

According to at least one embodiment, the computing resource allocation system may respond to computation requests received from external partners, vendors, and/or stores, among other external sources, by identifying and allocating autonomous vehicles on a roadway which may carry out the computation requests. Simultaneously, the computing resource allocation system may manage traffic on the roadway by computing a time required for a vehicle to reach and/or attend to the received computation request, analyzing a direction of travel of the attending vehicle, a number of vehicles on the roadway(s) which may be traveled by the attending vehicle, and/or other factors. An aggregated computing capability of autonomous vehicles traveling on the roadway(s) may be used to perform edge computation and may satisfy any computational needs received by the computing resource allocation system.

According to at least one embodiment, the computing resource allocation system may take into consideration a weather metric (e.g., a weather condition) when allocating autonomous vehicles to handle received computation requests. Based on a predicted weather condition, the computational services of an autonomous vehicle may be redistributed among other autonomous vehicles of the plurality of autonomous vehicles which make up the computing resource allocation system so that any computational needs of a nearby city and/or other location requiring a significant amount of computing resources may not be halted and/or paused. Computational services of an autonomous vehicle may be redistributed based on a volume of data to be processed, a type of data to be processed, a service level agreement defining details of completing a computation, and/or a number of computation requests and a priority of the computation requests, among other factors.

According to at least one embodiment, the computing resource allocation system may further identify any superseding health condition of an individual traveling within any of the autonomous vehicles which have opted into the system. If there is a superseding health condition present (e.g., a sick passenger, an emergency condition, etc.), then the autonomous vehicle carrying that individual may not participate in any edge computation and/or satisfy any roadside computational need(s) until and unless the superseding health condition is remedied.

According to at least one embodiment, the computing resource allocation system may facilitate a reward program whereby transactions between an autonomous vehicle and an external roadside vendor (e.g., a computational request submitted by the external roadside vendor and support for the request performed by the autonomous vehicle) may be performed for an exchange of resources. The reward program may benefit and/or give priority to autonomous vehicles who enabled their computing resources to be utilized for the benefit of other members (e.g., roadside vendors, shopping centers) of the computing resource allocation system. The benefit and/or priority given to the autonomous vehicles may include virtual rewards, points, and/or an exemption from having their computing resources utilized to satisfy other received computational request(s) in the future. Of course, monitoring of participation in the computing resource allocation system may require the consent of both the autonomous vehicle and the external roadside vendor. Consent may be obtained in real time or through a prior waiver or other process that informs a subject that their data may be captured by appropriate devices or other sensitive personal data may be gathered through any means and that this data may be analyzed by any of the many algorithms that may be implemented herein. Both the autonomous vehicle and the external roadside vendor may opt out of any portion of the computing resource allocation system at any time.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a computing resource allocation program 110a. The networked computer environment 100 may also include a server 112 that is enabled to run a computing resource allocation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. The autonomous vehicle 118 is depicted as shown as its own separate entity but may be integrated into another part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the computing resource allocation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the computing resource allocation program 110a, 110b (respectively) to utilize the collective computing resources of at least one autonomous vehicle (or a plurality of autonomous vehicles) traveling on a roadway to perform computation requests received from external vendors and/or sources. The computing resource allocation method is explained in more detail below with respect to FIG. 2.

Figure 2:
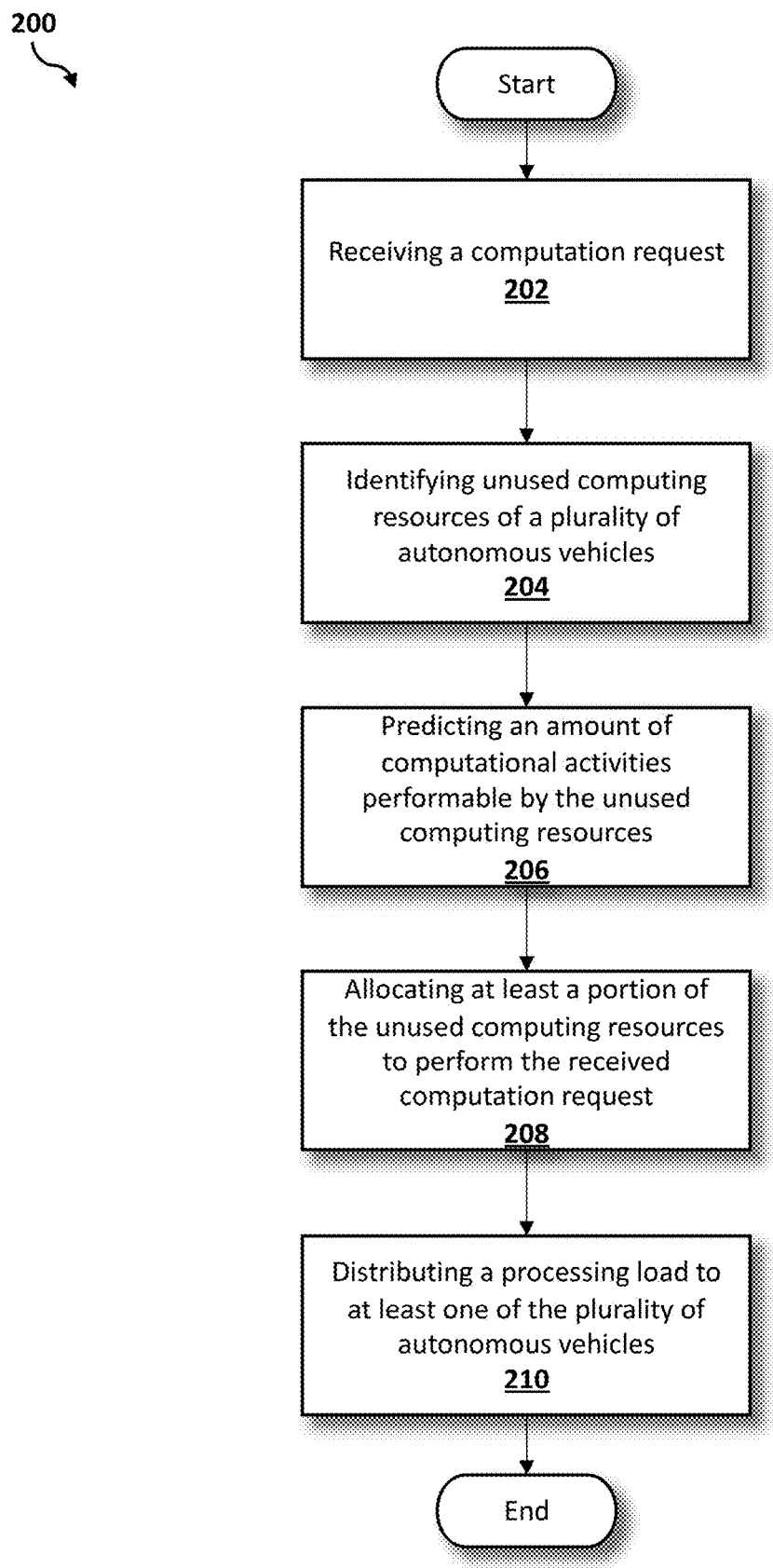
FIG. 2 is an operational flowchart illustrating a process for computing resource allocation according to at least one embodiment.

Referring now to FIG. 2, an operational flowchart illustrating the exemplary computing resource allocation process 200 used by the computing resource allocation program 110a and 110b according to at least one embodiment is depicted.

At 202, a computation request is received. A computation request may also be known as a computing request, which may be a basic method of communication used between computers in a network. A computation request is a request for data sent by a first computer in a network with a response being provided by a second computer in the same network. The network here may be a network of autonomous vehicles and external computers (e.g., client computer 102 which may be, for example, a mobile device, a telephone, a personal digital assistant, a netbook, a laptop computer, a tablet computer, a desktop computer, or any other type of computing device capable of running a program and accessing a network). The computing resource allocation program 110a, 110b may be running on the network which connects the autonomous vehicles to the external computers (e.g., client computer 102).

The computation request may be an edge computing request received by the computing resource allocation program 110a, 110b from roadside shops and/or vendors, among other sources who may be seeking computational resources to satisfy a computation request. The computation request may be received using an interface which enables the sharing of information and resources between users of the computing resource allocation program 110a, 110b, among other means. If the computation request is performable by connected autonomous vehicles of the computing resource allocation program 110a, 110b, as will be described by steps 204 through 208 below, then the received computation request may be validated (e.g., a validation may include a positive determination that the available resources are sufficient to perform the received computation request). An ability to perform a received computation request may be by a single autonomous vehicle or by a combination of two or more autonomous vehicles, as may be determined to be necessary by the computing resource allocation program 110a, 110b based on a plurality of factors which will be described in more detail below. Resources of autonomous vehicles participating in the computing resource allocation program 110a, 110b may be monitored and combined, where necessary, to carry out received computation requests.

For example, a computation request received by the computing resource allocation program 110a, 110b may include the streaming of show on a user's telephone (e.g., client computer 102) through a television streaming service based on the fact that the streaming is slow near the shopping complex where the user is located. Passing by autonomous vehicles who have opted into (e.g., signed up for, registered for, enrolled in) the computing resource allocation program 110a, 110b, and who have extra computing resources, may support the received computing request based on availability and bandwidth.

A smart contract (e.g., a computer code which may automatically monitor, execute and enforce a legal agreement) may be used by the computing resource allocation program 110a, 110b to appropriately handle each of the received computation requests. Practically, this may mean that, based on a legal agreement, each of the received computation requests may be provided appropriate security and/or may be isolated on different computing systems (e.g., different computing systems of passing by autonomous vehicles), as necessary, so that each request may be processed individually (based on, for example, the handling of privileged information).

At 204, the computing resource allocation program 110a, 110b identifies any unused computing resources of a plurality of autonomous vehicles.

Any real-time monitoring of an autonomous vehicle as mentioned herein requires the informed consent of all those people whose autonomous vehicle data is captured for analysis. Consent may be obtained in real time or through a prior waiver or other process that informs a subject that their vehicle data may be captured by sensors or other data may be gathered through any other means and that this data may be analyzed by any of the many algorithms that may be implemented herein. A person whose autonomous vehicle data is captured for analysis may opt out of any portion of the real-time monitoring at any time.

Each autonomous vehicle which opts into the computing resource allocation program 110a, 110b may be identified and a configuration (e.g., including a make, a model, and a computing capability, including details on any sensors, actuators, algorithms, machine learning models, and/or processors which may be used to create and maintain a map of the autonomous vehicle's surroundings based on a variety of sensors situated in different parts of the vehicle, among other specifications) of each of the autonomous vehicles may be recorded. A vehicle configuration may alternatively, or additionally in combination with any automatically identified configuration details, be manually inputted into the computing resource allocation program 110a, 110b by an owner and/or user of the autonomous vehicle.

A driving log (e.g., relating to past locations, a complete history of trips taken within a selected time frame, a location inputted into a global positioning system (GPS) and/or maps program, among other things) may also be gathered from each of the autonomous vehicles to identify any utilized and/or unutilized computing resources. As described previously, any real-time monitoring (e.g., as same applies to the collection of dynamic and up-to-date driving logs here) requires the informed consent of all those people whose autonomous vehicle data is captured for analysis. An analysis of driving logs of each of the autonomous vehicles may disclose how the vehicles are running (e.g., including a timing, a speed, and/or a route traveled by the autonomous vehicles, among other things), which may assist the computing resource allocation program 110a, 110b in identifying a distribution of utilized (i.e., used) and/or unutilized (i.e., unused) computing resources along a given route and/or within a given time frame.

At 206, an amount of computational activities performable by the unused computing resources is predicted. The present invention may utilize a machine learning model (e.g., historical learning) to predict aggregated computing resources which may be available for a received computation request based on performance of past computation requests. The machine learning model may consider any unused (i.e., unutilized) computing resources of each of a plurality of autonomous vehicles, as described previously with respect to step 204 above. Then, based on predicted computational needs of a received computation request (e.g., based on analysis of past performance of the same or a similar computation request), the computing resource allocation program 110a, 110b may predict a number of autonomous vehicles which may be required to support an associated workload (e.g., the associated workload of the received computation request).

In an embodiment, a supervised machine learning classification model may be trained to predict a number of autonomous vehicles which may be required to support an associated workload. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include past performance of the computing resources of autonomous vehicles to support the same or a similar computation request. The training data may include the type of computation request, an amount of available computing resources, and an amount of utilized computing resources for the received computation request (e.g., how much processing power has been needed to support this request in the past) and may be collected from a single user or a group of users, with user consent required prior to the collection of any training data. The classification results may be stored in a database (e.g., database 114) and may be constantly updated.

When a computation request is received, the computing resource allocation program 110a, 110b may identify autonomous vehicles which may be capable of performing the received request. An availability of an autonomous vehicle to perform a received request may be based on a number of computation requests received and an amount of memory and other computing resources to be distributed. Based on these identified metrics, among other metrics, the computing resource allocation program 110a, 110b may predict an amount of computational activities which may be performable by the unused computing resources predicted with respect to step 204 above (e.g., the aggregated resources of all autonomous vehicles of the computing resource allocation program 110a, 110b). As described previously with respect to step 202 above, a received computation request may be executed by a single autonomous vehicle or by a combination of two or more autonomous vehicles, as may be determined to be necessary.

At 208, at least a portion of the unused computing resources is allocated to perform the received computation request.

Allocating computing resources may include dynamically making one or more autonomous vehicles available for use by the computing resource allocation program 110a, 110b (e.g., by assigning a driving route and/or positioning one or more vehicles to enable resources of the vehicle(s) to be used in the processing of a received request). The computing resource allocation program 110a, 110b may enable the dynamic positioning of autonomous vehicles to support a received computation request. An autonomous vehicle may be a computer-controlled vehicle which may make driving decisions dynamically based on identified contextual situation(s). For example, driving decisions (e.g., lane changes, etc.) and/or setting a dynamic position of the autonomous vehicles (e.g., a relative position in a roadway presently traveled by an identified autonomous vehicle or which may be traveled by the autonomous vehicle based on an intended destination) may be made based on predicted computational needs and an ability to satisfy those needs (e.g., the ability being based on the determination with respect to step 206 above).

The computing resource allocation program 110a, 110b may also allocate unused computing resources of autonomous vehicle(s) based on a weather metric (e.g., a weather condition). This may include redistributing resources of autonomous vehicles based on increased computational needs of a nearby city and/or other location (e.g., so that such needs may not be halted and/or paused to satisfy any other received computation request). Computational services of an autonomous vehicle may be redistributed based on a volume of data to be processed, a type of data to be processed, a service level agreement defining details of completing a computation, and/or a number of computation requests and a priority of the computation requests, among other factors.

Additionally, for example, a participating autonomous vehicle may be rerouted by the computing resource allocation program 110a, 110b to avoid driving in a direction which may be dangerous (e.g., with winding roads, steep cliffs, and/or no streetlights, among other things) based on the identified weather metric. A rerouted vehicle may be utilized in another scenario (e.g., to support an alternative received computation request).

At 210, a processing load (e.g., an associated workload of a received computation request) is distributed to at least one of the plurality of autonomous vehicles. Depending on an availability of computing resources, as has been described herein, at least one of a plurality of autonomous vehicles may be sent a received computation request to be processed. The received computation request may alternatively be sent to more than one of the plurality of autonomous vehicles based on a complexity of the request, a volume of computation being handled by the autonomous vehicle, or many other factors. This may ensure that there is no latency in the system and that the requests may be timely processed.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
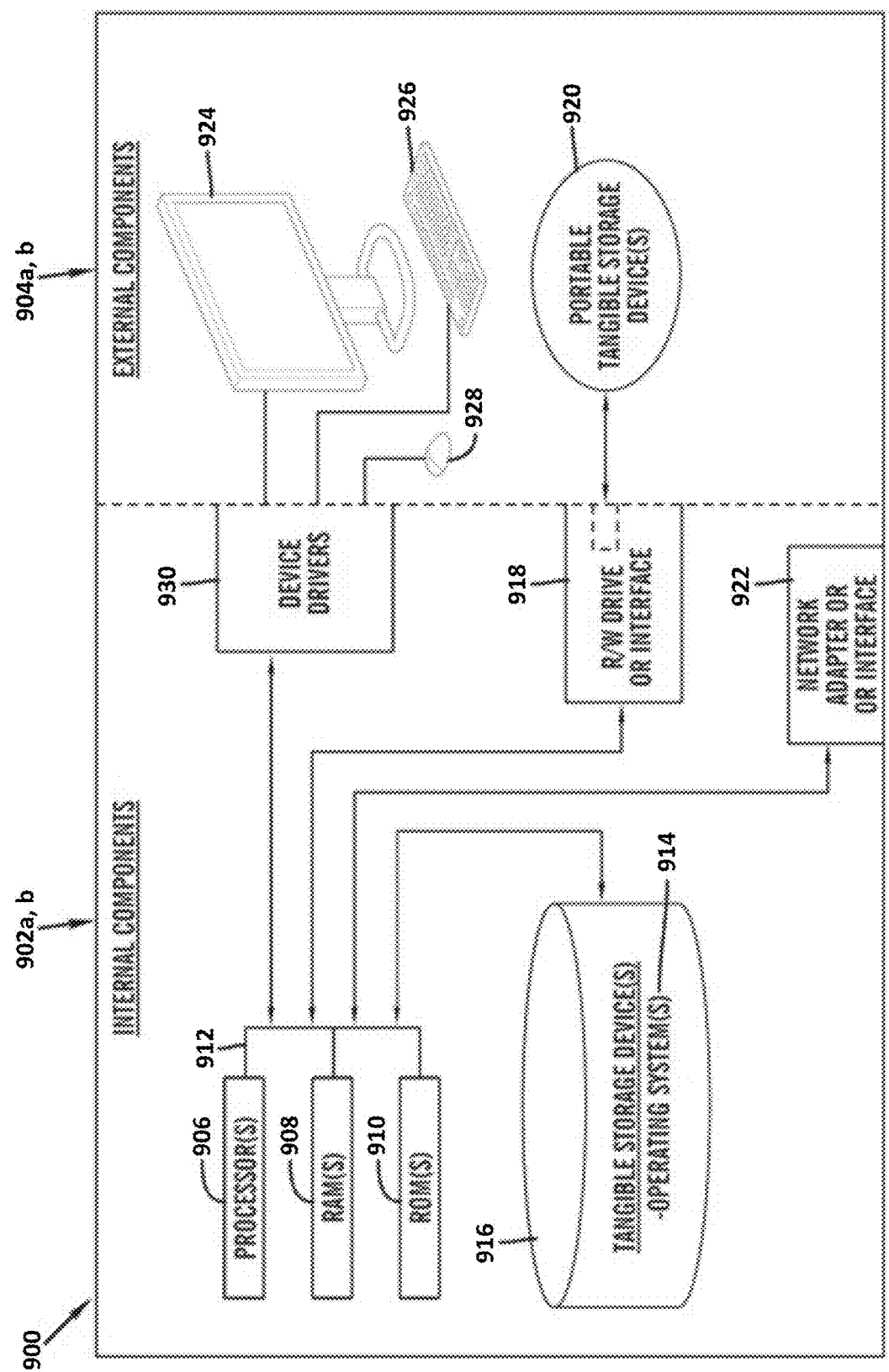
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 a, b illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the computing resource allocation program 110*a* in client computer 102, and the computing resource allocation program 110*b* in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the computing resource allocation program 110*a* and 110*b* can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the computing resource allocation program 110*a* in client computer 102 and the computing resource allocation program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the computing resource allocation program 110*a* in client computer 102 and the computing resource allocation program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
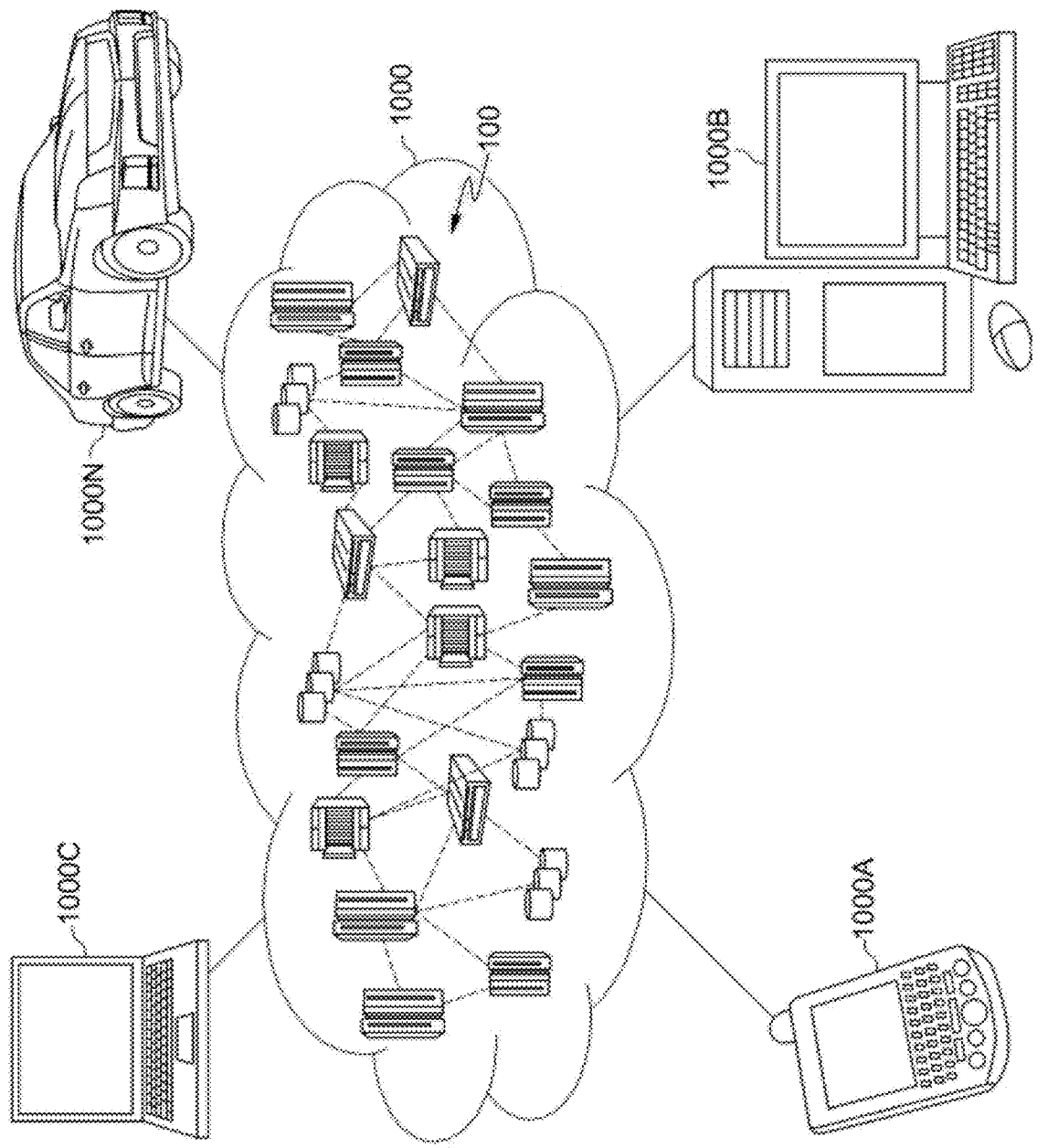
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
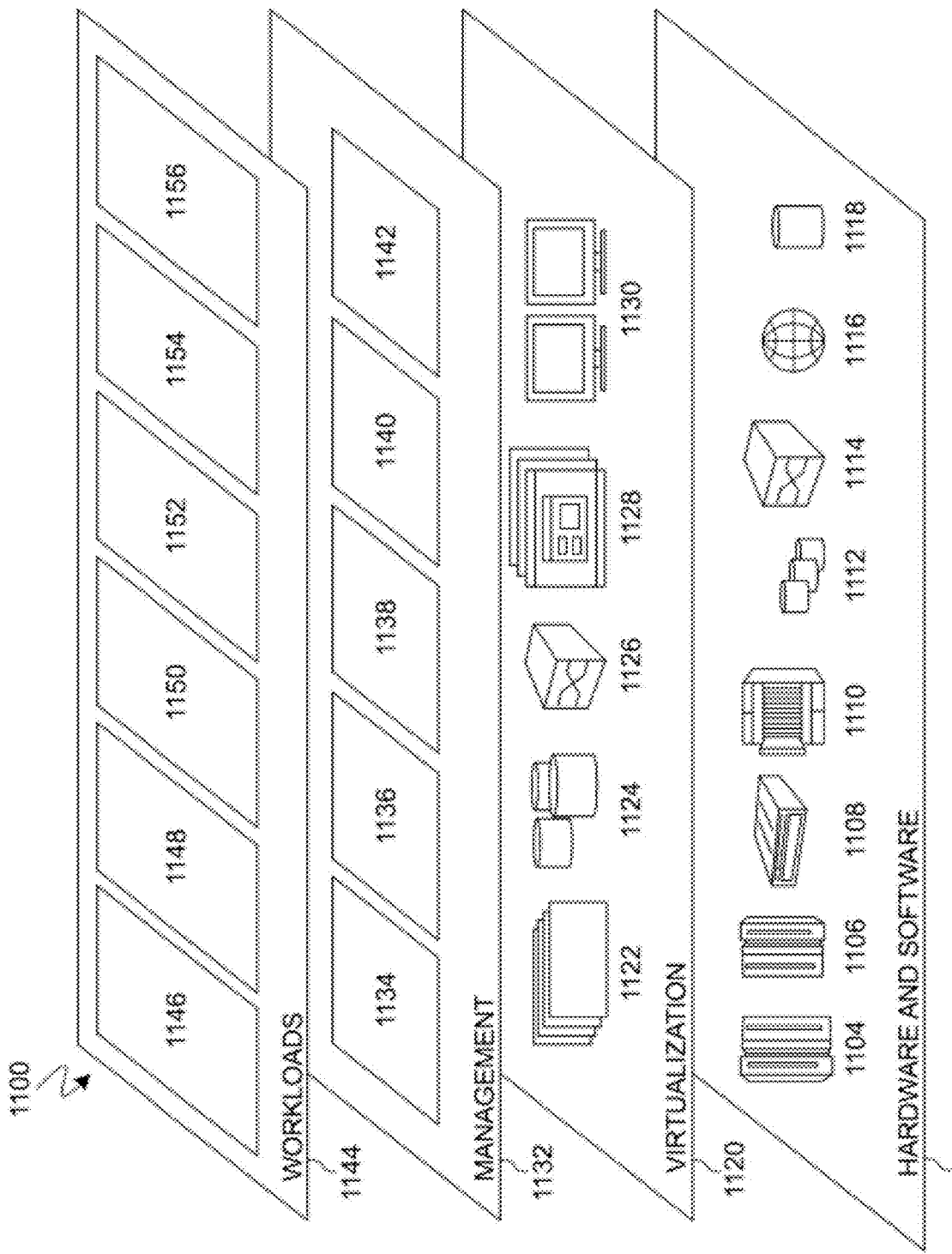
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and computing resource allocation 1156. A computing resource allocation program 110*a*, 110*b* provides a way to allocate unutilized computing resources of autonomous vehicles to provide computational service(s) to surrounding ecosystems.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for allocating unused computing resources of a plurality autonomous vehicles, the method comprising:
   receiving at least one computation request from at least one user;
   identifying the unused computing resources of the plurality of autonomous vehicles;
   predicting an amount of computational activities performable by the unused computing resources of the plurality of autonomous vehicles;
   allocating the unused computing resources of the plurality of autonomous vehicles to perform the predicted amount of computational activities, wherein the received at least one computation request is allocated at least a portion of the unused computing resources, wherein allocating the unused computing resources includes dynamically adjusting a driving route for at least one of the plurality of autonomous vehicles based on a computational need of the at least one computation request and the amount of computational abilities performable by the unused computing resources of the plurality of autonomous vehicles, wherein dynamically adjusting the driving route further comprises:
      causing the at least one autonomous vehicle to make a lane change and a speed change on a roadway to adjust a relative position of the at least one autonomous vehicle on the roadway to complete the at least one computation request; and
   distributing a processing load to at least one of the plurality of autonomous vehicles.

2. The method of claim 1, further comprising:
   identifying a vehicle configuration for each of the plurality of autonomous vehicles.

3. The method of claim 2, wherein identifying the unused computing resources of the plurality of autonomous vehicles further comprises:
   gathering a driving log from each of the plurality of autonomous vehicles; and
   analyzing the driving log based on the identified vehicle configuration.

4. The method of claim 1, wherein the dynamically adjusted driving route is further based on assessing at least one weather metric.

5. The method of claim 1, wherein, based on a complexity and a volume of the received at least one computation request, the computation request is allocated the portion of the unused computing resources of two of the plurality of autonomous vehicles.

6. The method of claim 1, further comprising:
   facilitating a reward system for the plurality of autonomous vehicles based on a level of participation.

7. A computer system for allocating unused computing resources of a plurality autonomous vehicles, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving at least one computation request from at least one user;
   identifying the unused computing resources of the plurality of autonomous vehicles;
   predicting an amount of computational activities performable by the unused computing resources of the plurality of autonomous vehicles;
   allocating the unused computing resources of the plurality of autonomous vehicles to perform the predicted amount of computational activities, wherein the received at least one computation request is allocated at least a portion of the unused computing resources, wherein allocating the unused computing resources includes dynamically adjusting a driving route for at least one of the plurality of autonomous vehicles based on a computational need of the at least one computation request and the amount of computational abilities performable by the unused computing resources of the plurality of autonomous vehicles, wherein dynamically adjusting the driving route further comprises:
      causing the at least one autonomous vehicle to make a lane change and a speed change on a roadway to adjust a relative position of the at least one autonomous vehicle on the roadway to complete the at least one computation request; and
   distributing a processing load to at least one of the plurality of autonomous vehicles.

8. The computer system of claim 7, further comprising:
   identifying a vehicle configuration for each of the plurality of autonomous vehicles.

9. The computer system of claim 7, wherein identifying the unused computing resources of the plurality of autonomous vehicles further comprises:
   gathering a driving log from each of the plurality of autonomous vehicles; and
   analyzing the driving log based on the identified vehicle configuration.

10. The computer system of claim 7, wherein the dynamically adjusted driving route is further based on assessing at least one weather metric.

11. The computer system of claim 7, wherein, based on a complexity and a volume of the received at least one computation request, the computation request is allocated the portion of the unused computing resources of two of the plurality of autonomous vehicles.

12. The computer system of claim 7, further comprising:
facilitating a reward system for the plurality of autonomous vehicles based on a level of participation.

13. A computer program product for allocating unused computing resources of a plurality autonomous vehicles, comprising:
one or more non-transitory computer-readable storage media and program instructions stored on at least one of the one or more tangible storage media, the program instructions executable by a processor to cause the processor to perform a method comprising:
receiving at least one computation request from at least one user;
identifying the unused computing resources of the plurality of autonomous vehicles;
predicting an amount of computational activities performable by the unused computing resources of the plurality of autonomous vehicles;
allocating the unused computing resources of the plurality of autonomous vehicles to perform the predicted amount of computational activities, wherein the received at least one computation request is allocated at least a portion of the unused computing resources, wherein allocating the unused computing resources includes dynamically adjusting a driving route for at least one of the plurality of autonomous vehicles based on a computational need of the at least one computation request and the amount of computational abilities performable by the unused computing resources of the plurality of autonomous vehicles, wherein dynamically adjusting the driving route further comprises:
causing the at least one autonomous vehicle to make a lane change and a speed change on a roadway to adjust a relative position of the at least one autonomous vehicle on the roadway to complete the at least one computation request; and
distributing a processing load to at least one of the plurality of autonomous vehicles.

14. The computer program product of claim 13, further comprising:
identifying a vehicle configuration for each of the plurality of autonomous vehicles.

15. The computer program product of claim 13, wherein identifying the unused computing resources of the plurality of autonomous vehicles further comprises:
gathering a driving log from each of the plurality of autonomous vehicles; and
analyzing the driving log based on the identified vehicle configuration.

16. The computer program product of claim 13, wherein the dynamically adjusted driving route is further based on assessing at least one weather metric.

17. The computer program product of claim 13, wherein, based on a complexity and a volume of the received at least one computation request, the computation request is allocated the portion of the unused computing resources of two of the plurality of autonomous vehicles.

* * * * *